United States Patent [19]

Schmidt

[11] Patent Number: 5,217,655
[45] Date of Patent: Jun. 8, 1993

[54] METHODS FOR PREPARATION OF COMPOSITE MATERIALS

[75] Inventor: Erick Schmidt, Edmonton, Canada

[73] Assignee: Envirotrust Technologies Inc., Toronto, Canada

[21] Appl. No.: 727,176

[22] Filed: Jul. 9, 1991

[51] Int. Cl.⁵ .................. B29C 43/18; B29C 47/02
[52] U.S. Cl. .......................... 264/22; 264/37; 264/40.4; 264/568; 264/571; 264/131; 264/132; 264/145; 264/174; 264/177.2; 264/274; 264/297.4; 264/320; 264/325; 264/DIG. 69; 425/113; 425/411
[58] Field of Search ............... 264/22, 40.4, 258, 132, 264/37, 568, DIG. 69, 145, 131, 320, 325, 297.4, 174, 177.2, 274, 571; 425/205, 113, 202, 411

[56] References Cited

U.S. PATENT DOCUMENTS

| | | | |
|---|---|---|---|
| 3,562,373 | 2/1971 | Logrippo | 264/37 |
| 3,788,923 | 1/1974 | Soliman | 264/258 |
| 3,806,562 | 4/1974 | Lamort et al. | 264/145 |
| 4,067,826 | 1/1978 | Emery | 264/37 |
| 4,098,649 | 7/1978 | Redker | 201/2.5 |
| 4,138,534 | 2/1979 | Tedesco | 264/45.5 |
| 4,187,352 | 2/1980 | Klobbie | 521/79 |
| 4,225,640 | 9/1980 | Erb | 428/2 |
| 4,279,790 | 7/1981 | Nakajima | 260/17.4 R |
| 4,439,387 | 3/1984 | Hawley | 264/174 |
| 4,464,510 | 8/1984 | Czvikovszky et al. | 264/331.15 |
| 4,968,463 | 11/1990 | Levasseur | 264/40.1 |
| 4,970,043 | 11/1990 | Doan et al. | 264/237 |

FOREIGN PATENT DOCUMENTS

| | | | |
|---|---|---|---|
| 146911 | 3/1981 | Fed. Rep. of Germany | 264/37 |
| 232455 | 1/1986 | Fed. Rep. of Germany | 264/37 |
| 53-36580 | 4/1978 | Japan | 264/37 |

Primary Examiner—Jeffery Thurlow
Attorney, Agent, or Firm—Panitch, Schwarze Jacobs & Nadel

[57] ABSTRACT

A process for preparing a composite product from an intake material incorporating commercial, municipal or industrial waste containing organic, plastic and fibrous material includes first granulating and sizing the material. The material is then heated in three consecutive phases, first at a temperature sufficient to achieve an internal temperature within the material of about 215° to 250° F., then at a temperature sufficient to achieve an internal temperature within the material of about 250° to 320° F. and then at a temperature sufficient to achieve an internal temperature within the material of about 320° to 400° F., wherein said material is continuously mixed during said heat phases. The material may then be co-extruded with a reinforcement structure and forced into vacuum profile dies to form a product or compression molded to form a product and cooled.

32 Claims, 1 Drawing Sheet

METHODS FOR PREPARATION OF COMPOSITE MATERIALS

FIELD OF THE INVENTION

The present invention is related to methods for recycling or converting municipal, industrial and commercial polymeric and fiber residues, including solid waste containing such residues. More specifically, the present invention is directed to methods for the preparation of composite products from such materials.

BACKGROUND OF THE INVENTION

Processes for treating waste or scrap materials containing thermoplastics have long been desired and numerous such processes are known in the art. For example, U.S. Pat. No. 4,968,463 discloses a process for treating waste which may contain plastic materials. The patented process comprises a preliminary physical treatment consisting of shredding or granulating the material, drying the material to a water content of not more than 8% by weight, preheating the material to a temperature of 80° to 160° C., kneading at a temperature of 120° to 250° C. and injection molding or extrusion of the material to form a final product.

U.S. Pat. No. 4,187,352 discloses a process for working up thermoplastic synthetic material into an article having the properties of wood. This process comprises fluidizing, molding and cooling the material. The waste material treated by the patented process may contain 20-25% non-plastic material. Other methods for processing waste or scrap containing thermoplastic materials are disclosed in U.S. Pat. Nos. 4,279,790 and 4,970,043.

Examples of waste processing methods which may be utilized for the treatment of organic or organic-containing materials are also known. U.S. Pat. No. 4,098,649 discloses a method of destructive distillation of organic waste material separated from trash or garbage which comprises compressing and heating the material in the absence of air in several stages. U.S. Pat. No. 4,225,640 discloses a method of recycling thermoplastic material from municipal waste which comprises the use of leaf material present in the waste.

However, conventional processes such as those discussed above, for treating waste or industrial scrap material require the sorting of the intake material prior to treatment. That is, such conventional processes generally require that "contaminate" materials be sorted or removed from the intake material to be treated prior to processing. For example, processes for treating polymerics may require sorting of the intake material to remove organic materials, fibrous materials, etc., while methods for treating organics generally require sorting to remove or separate thermoplastics. Such sorting steps necessitate the utilization of resources and labor which has proven to be expensive, thereby raising the cost of treating the intake materials. Accordingly, it can be seen that a method for processing unsorted waste or industrial scrap material is needed.

SUMMARY OF THE INVENTION

The present process for preparing composite products from mixtures of plastics and fibrous materials overcomes the difficulties found in conventional waste treatment methods discussed above. In accordance with the present process, composite products are effectively prepared without the necessity of sorting the intake material to remove fibers or organics. Moreover, the intake material may be blended with individual fractions of plastics or fibers so as to achieve a target formulation for the final composite product. The elimination of the need for sorting simplifies the procedure and reduces the labor cost involved in carrying out the process, which in turn reduces the cost of the finished article.

According to the present invention, composite products may be prepared from materials containing both plastic and fibrous fractions by a process comprising first granulating and sizing the intake material. The sized material is heated in three consecutive phases, first at a temperature sufficient to achieve an internal temperature within the material of about 215°-250° F., then at a temperature sufficient to achieve an internal temperature within the material of about 250° to about 320° F. and then at a temperature sufficient to achieve an internal temperature within the material of about 320° to about 400° F. The material is continuously mixed during the three heat phases. After exiting the third heat phase, the heated material is co-extruded with a suitable reinforcement structure. The heated material is then forced into profile dies and cooled to form a final composite product. The present invention is also directed to the use of a compression molding process to achieve a final product. The present invention also encompasses a process for preparing composite products from material comprising a mixture of plastics, fibrous materials and organic materials. The present invention is further directed to products prepared by these processes.

DETAILED DESCRIPTION OF THE INVENTION

Figure 1:
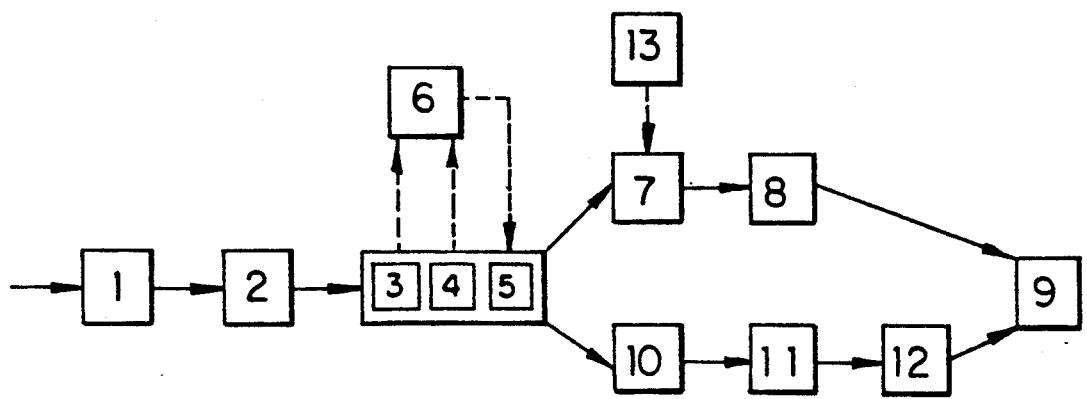
FIG. 1 shows the main steps of the process according to the present invention in diagrammatic form.

The present invention is directed to a continuous process for converting materials containing both fibrous and plastic fractions into composite products. The material to be treated by the present process (hereinafter referred to as the "intake material") may also contain some amount of organic materials, such as foods, vegetation, vegetable oils, etc. Preferably, the present process is used to recycle or convert waste or residual industrial, commercial or municipal material containing plastic materials, fibrous materials and possibly organics into composite structures.

An advantage of the present invention is that, when used as a waste conversion method, the present process can utilize all plastic, fibrous and organic components of the waste and thus, only metals need be sorted from the intake material prior to treatment. Even waste which is presently considered to be pollutants and environmental hazards, such as fast food packaging and oil containers, does not have to be separated or sorted from the intake material prior to treatment with the present method. A further advantage of the present process, whether used for treatment of waste or other materials, is that organic residues also need not be separated from the intake material.

The present process allows for the use of a combination of a variety of individual plastics and fibers (and possibly organics) to create composite products with varying properties. In this regard, the composition profile of the intake material is calculated an considered in combination with other material profiles which may be combined with the intake material to achieve a target composition. The materials having a known statistical profile may then be processed with the intake material to arrive at a composite product having the desired profile. This procedure is discussed in more detail below.

Moreover, unlike most conventional recycling processes, the present method accepts the intake materials in wet and/or oily conditions, thus reducing or eliminating the need for pre-drying of the intake material. Pre-drying of the intake material is no required due to the high temperatures and pressures employed in the present process as described more fully below.

Many varied materials may be effectively treated with the present process. Typical waste or scrap materials which may be recycled or converted into a composite product with the present process are, e.g., plastic containers (such as those for detergents, margarine, yogurt, etc.), plastic shopping bags, clothing, running shoes, battery cases, baler twine, books and magazines, plywood, sawdust, fiberglass, etc. The plastics fraction of the intake material may comprise materials containing, e.g., linear low density polyethylene, low density polyethylene, high density polyethylene, polypropylene, polystyrene and PVC. The fibrous fraction of the intake material may comprise, e.g., paper, aluminum foil, sawdust, plywood, fiberglass, cardboard, carpet and apparel fibers. Additionally, the intake material may contain organics, such as residues from food containers, and food wastes.

The intake material should generally comprise about 50 to about 80 weight percent of the plastic fraction. Preferably, the intake material comprises the plastic fraction in an amount of about 60 to about 70 weight percent of the total weight of the intake material. The fibrous material fraction should account for about 20 to about 50, and preferably about 30 to about 40 weight percent of the total weight of the intake material. If the intake material further comprises organic materials, these materials may be present in an amount of about 5 to about 20, and preferably a maximum of about 10 weight percent of the total weight of the intake material.

The process for preparing composite products from a mixture of plastic and fibrous materials according to the present invention can best be described with reference to FIG. 1. The present process comprises granulating the intake material containing at least plastic and fibrous fractions 1; sizing the granulated material 2; heating the material in three consecutive phases identified as 3, 4 and 5, first at a temperature sufficient to achieve an internal temperature within the material of about 215°-250° F. (i.e., step 3), then at a temperature sufficient to achieve an internal temperature within the material of about 250° to about 320° F. (i.e., step 4) and lastly at a temperature sufficient to achieve an internal temperature within the material of about 320° to about 400° F. (i.e., step 5), wherein the material is continuously mixed during the heat phases; co-extruding the material with a suitable reinforcement structure 7; forcing the material into a vacuum profile die system to form a product 8; and cooling the product 9.

The granulation step 1 may be carried out by conventional granulating devices which are known to be utilized for cutting and re-grinding plastics and fibers. For example, a typical granulator for use in the present process will consist of knives mounted on rotors which shear the intake material against knives mounted on the interior wall of a cutting chamber. Examples of appropriate granulators which may be used in the present process are, e.g., Ball & Jewell granulators manufactured by Sterling, Inc. of Milwaukee, Wis. The granulation continues in such a manner and for a sufficient period of time to process the intake material into fragments or particles of appropriate size. Generally, the size of the fragments or particles may be determined and controlled by passing the granulated material through an appropriate base screen, i.e., step 2 in FIG. 1. However, the granulation and sizing steps 1 and 2 may be combined and performed as one step. The material should be sufficiently granulated so as to achieve particles having a diameter of about 1/16 to about ⅜ and preferably about ⅛ inch.

After granulation, the intake material is heated in three consecutive phases. The first heat phase 3 comprises heating the granulated material at a temperature sufficient to achieve an internal temperature within the material of about 215° to about 250° F. Preferably, the material is heated at a temperature sufficient to achieve an internal temperature of about 220° to about 230° F. The temperature of this first heat phase should be sufficient to volatize and dehumidify water particles within the intake material; dehydrate organic particles within the intake material; and sterilize and decontaminate the intake material by destroying certain existent bacteria or other microorganisms. However, the temperature in this first phase should not be sufficiently high to substantially melt plastic particles within the intake material.

The second heat phase 4 comprises heating the intake material at a temperature sufficient to achieve an internal temperature within the material of about 250° to about 320° F., depending upon the formulation. The internal temperature achieved in the second heat phase should be sufficient to cause low temperature polymers within the intake material (particularly polyethylene particles) to melt, thereby insuring the efficient coating of all fibers and organics within the intake material.

The third heat phase 5 comprises heating the material at a temperature sufficient to achieve an internal temperature within the material of about 320° to about 400° F., dependent upon the formulation. The internal temperature achieved in the third heat phase should be sufficient to allow the fibrous fraction within the material to maintain its solid state while melting plastics having a higher melting point contained within the material. Such heating of the intake material at pressures commonly used in extruders and as further described below insures that the higher temperature polymers completely melt and fully encapsulate the fibers and contaminants contained in the material.

Generally, each heat phase should be maintained for a period of time sufficient to accomplish the objectives for each discussed above. Accordingly, different time periods for each heat phase may be necessary or desirable depending upon the specific profile of the intake material being processed and the properties of the materials. For example, an intake material comprising a high percentage of polyethylene may require a second heat phase of shorter duration than one comprising a high percentage of PVC, since polyethylene has a lower average melting point. Thus, appropriate time periods for each heat phase for particular intake materials will be evident to one of ordinary skill in the art from the present disclosure.

The intake material is continuously mixed during the three heat phases. The method of mixing is not limited to a particular type. However, the mixing must be sufficient to ensure the uniform heating of the entire intake material and the uniform coating of the fibrous and organic fractions by the plastics fraction. Generally, appropriate mixing speeds are about 30 to about 75 rpm, but may vary dependent upon the composition of the intake material as well as the temperature and pressure at which it is being treated.

The heating and mixing of the intake material may be carried out with any appropriate equipment known to those skilled in the art, the use of which will be evident to one skilled in the art from the present disclosure. Examples of commercially available, appropriate extruders are, e.g., Single Screw Davis-Standard Extruders manufactured by Davis-Std., Division of Crompton and Knowles Corp. of Pawcatuck, Conn.

After exiting the third heat phase, the intake material has the properties of an emulsion of polymeric material encapsulating or coating fibrous material, organic materials and any other solid contaminants, as well as any existent compressed vapor cells. In order to achieve a superior final composite product, it is important that this encapsulation or coating by the plastic fraction of the material be achieved. In order to achieve the appropriate degree of encapsulation or coating, it is necessary that the heating (and mixing) phases be conducted under sufficiently high pressure to ensure adequate mixing and compound of the material. Accordingly, during heating in each of the three heat phases, a pressure of about 2,000 to about 7,000 psi and preferably about 2,500 to 3,000 psi must be maintained. The maintenance of the pressure within the above-noted ranges allows one to control the number and size of vapor cavities in the material to target specific densities for the final composite product. For example, the pressure may be decreased and the material devolatized to result in less vapor cavities in the final product. The devolatization may be effected, e.g., by the use of a barrel vent in the heating apparatus.

The process of the present invention further comprises incorporating a reinforcement structure within the material. The use of the reinforcement structure improves the physical characteristics of the composite product to meet engineering specifications and allows minimum performance specifications to be met. This provides a significant advantage over conventional "plastic lumber" which cannot guarantee minimum performance specifications due to the variability of intake materials. Moreover, the inclusion of the reinforcement structure within the composite products combats the problem of "creep" which generally occurs in most plastics. Since the reinforcement structures useful in the present invention are encapsulated within the molten plastic-containing mixture, which is a waterproof material, the need for costly pre-treatment of the reinforcing profile, such as galvanizing if the reinforcement material is steel, is eliminated.

The reinforcement structure is co-extruded with the intake material after the intake material has exited the third heat phase. This is represented as step 7 in FIG. 1. The reinforcement structure is preferably incorporated within the intake material by pressurized co-extrusion through a cross-head co-extrusion and die unit assembly. The reinforcement structure is introduced into the co-extrusion zone as represented by step 13 in FIG. 1. It is preferred that the reinforcement structure have an appropriate computer-designed configuration or shape to maximize the mechanical strength supplied thereby for a particular end use. Such computer-designed configurations or shapes are well known to those in the art and reinforcement structures having specific configurations and shapes useful in the present invention will be evident to one skilled in the art from the present disclosure. Since such reinforcement structures derive strength from the bends and curves of the profile and not solely from the mass thereof, it is possible to use a minimum amount of the reinforcement material by weight to achieve a high performance composite. The reinforcement structures useful in the present process do not have a smooth surface, but rather incorporate perforations, indentations, flanges, etc., in order to achieve a strong mechanical bond with the composite material.

Many suitable materials may be employed as reinforcement structures useful in the present invention and thus, the present invention is not limited to a particular material therefor. However, examples of suitable materials useful as the reinforcement structures are metal profiles, such as steel wire; cold rolled steel; and aluminum.

After the co-extrusion of the reinforcement structure, the molten intake material containing the reinforcement structure is then forced into vacuum profile die systems for sizing and formation of a final product, i.e., step 8 in FIG. 1. Any appropriate vacuum profile die systems or assemblies known to those skilled in the art may be used for this purpose. The dimensions of the vacuum profile die systems used in the present process must be machined to appropriate dimensions to produce a desired final composite product.

The vacuum profile die system is positioned within a chilled vacuum tank. The vacuum profile die system contains vacuum slots which create a high pressure differential within the system itself, thereby maintaining the extruded material in close tolerance to the inner walls thereof. The vacuum profile die system provides dimensional control to counter normal material contraction and insures the consistent dimensional quality of the final product.

Figure 2:
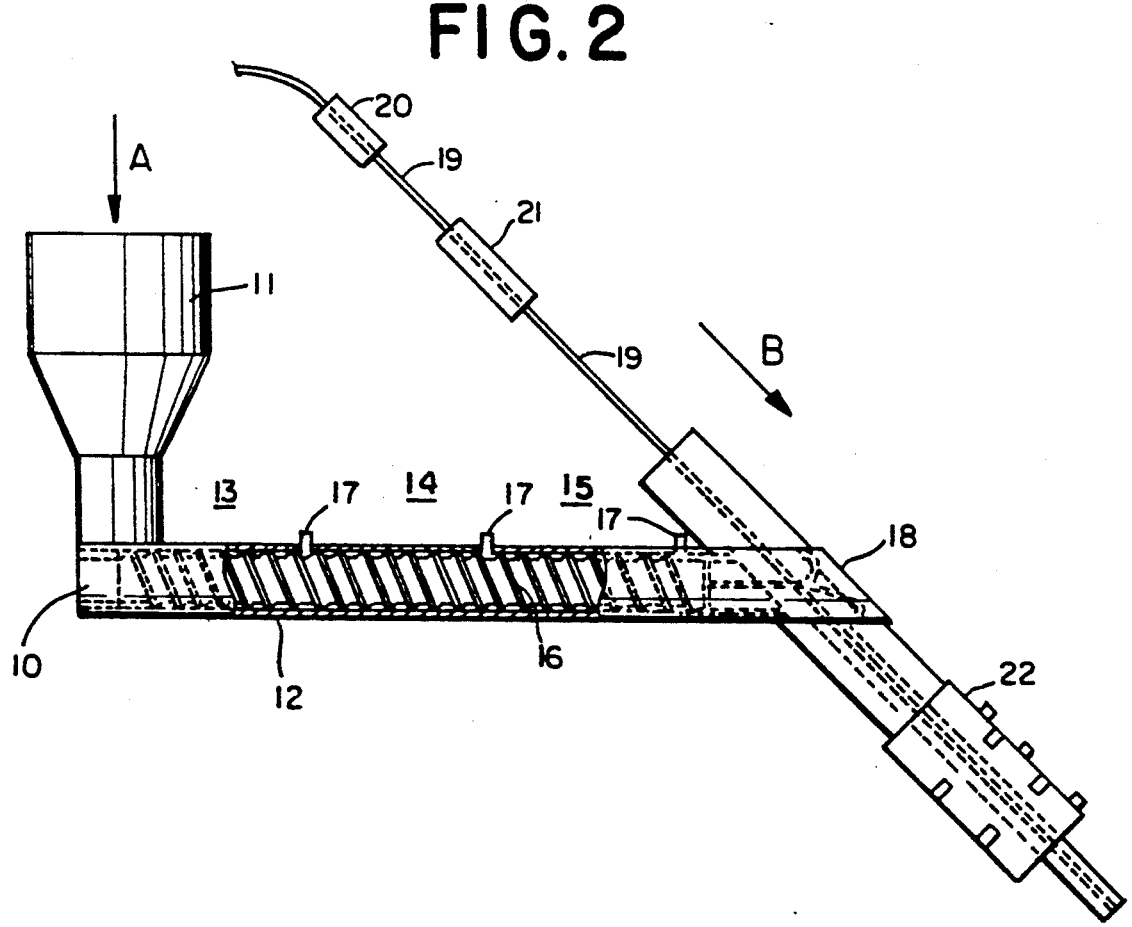
FIG. 2 is a schematic cross-section of an assembly useful in carrying out the present process.

The process thus far discussed can best be described with reference to FIG. 2 which depicts an useful assembly for carrying out the present process. As can be seen in FIG. 2, the intake material enters the assembly 10 at intake section 11 in direction of arrow A. The intake material then enters the horizontal barrel extruder 12 wherein it is heated and mixed. Specifically, the material is heated in the first, second and third heat phases 13, 14 and 15, respectively, while continuously being mixed by extruder screw 16. During the heat phases, excess gas is allowed to exit the material through vents 17.

Once the heated material exits the extruder, it arrives at the cross-head co-extrusion and die assembly 18. It is at this point where the molten composite material and the reinforcement structure are co-extruded. The reinforcement material is fed along line 19 in the direction of arrow B to the assembly. A hole perforator 20 and roll former 21 may optionally be included on the feed line 19. After co-extrusion takes place, the co-extruded material is further fed to a vacuum profile die system 22 for formation of a product.

After exiting the vacuum profile die system, the material then must be cooled to an internal temperature of about 55° to about 70° F. This cooling step is represented by step 9 in FIG. 1. The present composites carry enormous heat loads which must be extracted efficiently and quickly in order to insure quality shape, dimensional stability and to maintain good throughput production speeds. Generally, the product may be cooled in any appropriate manner known to those skilled in the art and the present process is not limited to any single cooling method. However, it is preferred that mist spray cooling tanks be employed as the method of cooling the composite product of the present process.

Alternatively, or in addition thereto, secondary cooling may be accomplished through the use of cooling tanks and chambers incorporating a turbulent water system connected to recycling chillers. The mist spray or turbulent water flow within the cooling tanks significantly increases the rate of heat transfer from the heated product. An additional supplementary cooling method useful in the present process incorporates the use of an overnight holding cooling tank with sized racks or jigs to support the dimensional quality of the material and to prevent plastic "creep" during the cooling period until the internal temperature of the material is sufficiently reduced and stabilized. The material is maintained in this manner until a temperature equilibrium is reached throughout the product.

Once the final composite product is cooled, it is ready for use. The products produced by the process described above may be used for numerous applications, such as industrial posts, beams and columns used in construction, etc. The composite products prepared in accordance with the present method have physical properties similar or superior to hardwood. For example, the composite products may be cut with conventional woodcutting equipment to high tolerances, sawed, nailed and exhibit great holding properties with wood screws. Moreover, the composite structures may also be processed on metal machinery and demonstrate high tolerances similar to high performance machinery plastics, such as nylon.

As an alternative to the vacuum profile die system described above, the material exiting the third heat phase may be treated with a compression molding process to form the desired final product. The compression molding process is represented by steps 10, 11 and 12 in FIG. 1. Compression molding addresses the problems caused by the extended heat and chill cycles of the present process. In comparison to conventional processes, the heat and chill cycles of the present method may be intensified or lengthened since the intake material may comprise thermoplastics (such as HDPE) as the polymeric fraction while recycled thermosets (such as acrylics) may be included in the intake material as the fibrous fraction. Thus, the extended time required to heat the present thermoplastic-based composite in preparation for the compression molding process requires external pre-heating to overcome the costly alternative of extended cycling time using conventional compression technology. Thus, it is preferable that the compression molding process directly follow the third heat phase, so that the processing temperature of the material (i.e., an internal temperature of about 320° F. to 400° F.) is maintained until the compound is inserted into the compression molds, obviating the need for costly reheating.

The compression molding process used in the present invention generally employs cold molds. The use of cold molds is advantageous in view of the extended heat cycle required for the present thermoplastic-based composites described above. Problems relating to the heat and chill cycles are compounded by the thick wall and large mass of certain products produced by the present process. The use of cold molds as well as the chilling process is thus critical, both in terms of efficiency in removing heat from the product and the maintenance of dimensional stability and product shape.

In the present compression molding process, the hot composite material exiting the third heat phase, which has a dough-like consistency, is placed in a cold cavity die (step 10). Preferably, the cavity dies are not permanently affixed to the platens of the compression machine. The cavity die should have an extended throat which provides enough loading space for the loose, hot composite compound, the insertion of the male plug and the distance needed to retain the material as it is compressed within the mold by the closing action of the press. The vertical entry of the cavity mold should be designed with a tight clearance tolerance for the plug (e.g., about 0.003 to 0.010 inches) to restrict the outflow of the compressed composite compound as it is subjected to high pressure while the mold is closed. The external construction of the mold must be designed to withstand the range of pressure (i.e., 2,000 to 7,000 psi) impacting on the composite material contained therein. Unlike conventional practice, the compression molding process useful in the present invention employs a number of identical molds used in a continuous process. Moreover, both the cavity dies and the plugs are independent of the press platens.

The compression molding process is carried out in the following manner. The hot material exiting the third heat phase is first placed into the loading space of the cavity die (step 10) and the plug is the inserted in the top of the die (step 11). This two part mold is then placed in position on the bottom platen of the press and the upper platen is lowered on the extended neck of the plug, descended to the limit of the pressure cycle and then raised (step 12). Before the platen is raised, the two-part mold is locked together, e.g., with mechanical tension clamps, so that pressure remains after the platen is raised.

Since there is no requirement to either heat or cool the material while in the platen area, the pressure cycle can rapidly occur and production rates may reach about 5 seconds. This cycling time is much faster than conventional hot molding systems and results in an increased production efficiency. Moreover, in commercial production systems employing the present invention, robotic units may be incorporated to automate the filling of the molds and the high speed insertion and ejection of the molds from the platen press area.

After removal from the press area, the molds containing the composite material are cooled (step 9) to reduce the temperature of the molds and the composite material to the product removal target temperature. The appropriate removal temperature is that which will allow the product to maintain dimensional stability once removed from the mold. Thus, the appropriate removal temperature will vary dependent upon the composition of the material being processed. However, generally, the product should be cooled to an internal temperature of about 55°–95° F. As it is being cooled, the controlled shrinkage of the composite formulation reduces the pressure inside the mold and assists in the removal of the product from the mold. The cooling step may be conducted by any appropriate cooling means evident to one skilled in the art from the present disclosure, such as those discussed above. At the end of the cooling step, the molds are opened and the product removed. After removal of the product, the molds may then be re-routed back to the pre-staging area for another cycle.

The compression molding process may be used with the extruder assembly 12 depicted in FIG. 2. However, when the compression process is used, the material exiting the extruder will be fed directly into the compression die assembly and not the crosslinked co-extrusion and die assembly as depicted.

When the compression molding process described above is employed in the present method, generally, a metal reinforcement profile need not be added in order to achieve a final product having excellent properties and which meets engineering specifications. However, if desired, pieces of metal, stone, abrasives, sand or other materials which will provide a reinforcement surface or abrasive function to the composite product may be added at the same time the extruded material is added to the cavity dies or may be added in a two-stage laminate-type process as described below. Alternatively, pieces of metal or other appropriate material may be incorporated into the product by such a two-stage process to provide an interlocking function between two separate products. This material then goes through the cycle described above.

The use of the compression molding process also allows for the preparation of a laminate-type final product. Specifically, a smaller amount (i.e., less than the amount necessary to fill the cavity die) of the intake material may be added to the cavity die and pressed in the manner described above. Prior to cooling, additional material may be added to the cavity die on top of the pressed material, pressed again, and then cooled in the manner described above. The second batch of material should be treated in accordance with the present process (i.e., treated with the three heat phases) if it is a composite material. If the additional material is a pure thermoplastic formulation, it should be heated to a temperature sufficient to achieve an internal temperature within the material of about 320°–400° F. The advantage of such a laminate-type or layered structure is that materials having known properties may be added to the intake material in order to form a final product having an outer surface or layer with desired properties and characteristics.

Products prepared with the present process employing compression molding have compression properties superior to those of hardwood, impact properties superior to ceramics and concrete and can be machined with conventional wood and metal processing equipment. These products may be used for numerous applications, such as bricks, tiles, horticultural containers, etc.

Due to their fiber content, the composite products prepared in accordance with the present process exhibit superior resilience in cold temperature applications. Moreover, the composites are waterproof and those prepared with vacuum profile dies may be formulated so as to maintain a bouyant specific gravity for float applications.

The final product prepared in accordance with the present invention may, after cooling, be coated with numerous materials as required for a particular use. For example, the product may be coated with coloring agents, such as iron oxides, or ultraviolet light absorbents, such as carbon black or titanium dioxide. An example of an appropriate method of coating is co-extrusion utilizing a cap-stock polymer formulation. Moreover, the final product may be subjected to ionizing radiation from high-energy electron accelerators to crosslink molecules within the plastic in order to provide a final composite product with improved mechanical properties. Examples of applicable crosslinking processes are, e.g., those used by Radiation Dynamics Inc. of Melville, N.Y.

It is preferred that the present process be carried out as a continuous linear production process, although the present process is not limited thereto. Such a procedure offers high production throughput, lower maintenance and superior quality control in comparison to conventional batch processing technologies. The continuous processing operation also allows for greater control of the pressure, temperature and dimensional stability as the material moves through the various processing stages. Moreover, the continuous production process provides a further advantage in that the processed materials will have an unlimited length potential.

Alternatively, the present process may be conducted in stages wherein the granulated and sized material is treated with the first two heat stages and is then stored for later processing. This is represented by step 6 in FIG. 1. When it is desired to complete the processing, the material need only be heated to the temperatures required in the third heat phase and mixed as described above. Once the internal temperature is brought to that of the third heat phase, the material is ready for the vacuum profile die or compression molding stage. The granulated and sized particles may be stored for an indefinite time period before being further processed. This allows for regional processing of the first stage of the present process with later, final processing in a centralized facility.

As discussed above, the intake material which is treated by the present process need not be sorted and no materials or contaminants need be removed therefrom. Instead, a statistical average profile of the intake material is developed detailing its composition and specific weight percentage of the different fraction contained therein. For example, a profile of the intake material may be taken in order to determine the percentage of plastics, fibers and organics contained therein. The statistical profile may be conducted by first sorting a defined portion of the total material. The profile of the portion is then taken and the amounts of each fraction in the portion are weighed. These amounts are extrapolated to determine the total amount of each fraction in the total intake material.

If the desired composition of the final composite product does not match that of the statistical profile, an excess of the needed materials may be added to the intake material prior to processing by the present method in order to obtain a final composite product having the desired profile composition. In this manner, the composition profile of each intake material may be calculated in combination with other material profiles to achieve a target composition which is processed by the present method to form a final composite product. In order to obtain specific percentages of certain components within the composite product, commonly available industrial residues comprising the desired materials may be incorporated within the intake material. For example, milk bottles may be used to provide a high percentage of HDPE.

For example, a final product having a minimum of 50 percent high density polyethylene may be targeted. If the intake material does not contain the necessary percentage of polyethylene, the desired composition profile may be obtained in the final product by combining various granulated fractions containing high percentages of polyethylene (such as plastic milk bottles) with the intake material. This mixture is then treated with the present process. In this manner, a final composite having a specific, desired composition may be obtained. Moreover, the present process may be used with materials having known plastic and fibrous fractions in order to obtain a final product having a known, desired statistical profile.

By controlling the composition of the intake material in such a manner, the composition of the final composite product can be controlled. Thus, the present method allows one to target and obtain specific, desired performance specifications.

The present invention will now be illustrated with reference to the following specific example.

PREPARATION EXAMPLE

A target product (industrial chain link fence posts) and the corresponding plastic/fiber composite formulation were selected. The formula was designed to achieve a statistical average comprising 60% of the plastic fraction, of which about 50% is polyethylene thermoplastics, and 40% of the fibrous fraction comprising paper packaging and clothing.

40% by weight of the plastic fraction was comprised of damaged HDPE soft drink bottle carrying cases. An additional 20% by weight of the plastics fraction was obtained in the form of mixed waste plastics collected and baled by a municipal recycling program, which statistically contains about ⅜ polyethylene. This recycled plastic comprised a random mix of all types of household plastic which were not sorted or cleaned. These two above sources of plastic waste comprised the polymer fraction of the composite.

The fiber fraction came from discarded clothing (25%) comprising a random mix of textile fibers including cotton, wool and polyester blends. The remaining 15% was sourced from mixed waste papers obtained from curbside recycling programs comprising items such as cereal and detergent boxes, colored glossy brochures, wax papers and gift wrap.

Each of the above separate fractions were conveyed to an industrial Ball & Jewell granulator manufactured by Sterling Inc. of Milwaukee, Wis. The material was sequentially granulated and screened into fine particles (less than ¼").

The granulated fractions were conveyed and weighed (in this case, 40,20,25 and 15 percent) and placed in an industrial ribbon blender. The material was mixed for approximately 5 minutes until a homogenous mixture was obtained.

The granulated and blended formulation was then transferred to a hopper above the intake port of a 3½" Brampton single screw extruder with a 24:1 l/d ratio. The material was extruded at 30 rpm, and the barrel temperature controls were set at 250, 290, 300, 325 and 330 to develop an internal temperature within the formulation of about 220° F. in the first heat phase and about 320° F. in the second heat phase. When treated in this manner, the blending of the material is improved, as the barrel temperature and the increased compression created by the screw design melts the polyethylene particles thus encapsulating the fibrous fraction and particles of high temperature plastics.

In this example, the extrusion process was performed into two stages. In the first stage described above, the extruder was not connected to the co-extrusion reinforcing chamber of the vacuum sizing unit. The material was allowed to exit directly from the extruder barrel into open atmosphere where the melted and blended mixture was decompressed and the water vapor and other gases were suctioned away for environmental processing. This devolatization removed moisture that was not removed from the composite formulation at the beginning of the process.

The melted and blended formulation was then stored for 1 day, reheated and subjected to further mixing and compression in a second extrusion process employing this same extruder as identified above with the barrel temperature set at 350° F., to achieve an internal temperature within the material of about 325° F. (i.e., the third heat phase). As the heated composite mixture exited from the high compression extruder, it entered a co-extrusion unit comprising a combined cross-head block and profile shape die unit. The composition mixture then expanded in the co-extrusion zone and encapsulated a 20 inch cold-rolled perforated steel profile reinforcing member, and then was drawn down to the precision calibrated entry port of the vacuum sizer. The co-extrusion unit was connected to a custom engineered 3 inch round channel vacuum sizer system operating at a vacuum of approximately 1.5 psi (0.1 atm). The combination of the internal pressure in the composite mixture and the suction created by the vacuum sizer held the plastic material against the walls of the polished steel die as it continuously moved through the vacuum sizer and cooling tank. The cooling tank had a length of approximately 10 ft. The cooling tank incorporated recycled chilled water flow to cool the material. As the composite extrusion cooled and hardened from the plastic surface inwards, it maintained the specified dimensions and avoided the problem of shrinkage common in all "plastic lumber" closed mold systems.

The extrusion then moved into a second cooling tank having a length of about 15 ft. which was not under vacuum. After exiting the second cooling tank, the material entered a tractor/puller, which functioned to maintain a constant pulling force on the entire extrusion length to balance the "pushing" effect of the extruder screw. The extrusion continued through the puller unit and entered a custom-built automatic cut-off saw to produce products of pre-selected lengths.

The process of this example may be modified as needed for desired commercial production. For example, the two stage process described above may be integrated into one longer extruder with multiple stage screw design and a l/d ratio of up to 38:1 (on a 4.5" diameter screw). Such an extruder will generally incorporate a devolatization and vacuum extractor system attached to an environmental scrubber.

Moreover, it should be noted that if the above formulation was modified and the main plastic fraction was substituted with a plastic fraction containing a high percentage of residual oils, such as that found in engine oil or vegetable oil packaging, it would be necessary to include in the formula at least 15% absorbent fibers such as newspaper or telephone book cellulose fibers to soak up the oil clinging to the plastic surfaces. This would allow the oils to be consistently blended in the extruder where it would be partially volatized and equally suspended throughout the composite mixture, yielding an acceptable product applicable for construction materials. If no absorbent fibers were used in such a situation, the oil residuals would partially separate and drain to the bottom of the extruder barrel, finally exiting in liquid form from the extruder, adversely impacting the subsequent vacuum forming stage.

The present invention may be embodied in other specific forms without departing from the spirit or essential attributes thereof and, accordingly, reference should be made to the appended claims, rather than to the foregoing specification, as indicating the scope of the invention.

I claim:

1. A process for preparing composite products having a specific target composition from an intake material incorporating commercial, municipal or industrial waste containing organic, plastic and fibrous material comprising:
   taking a statistical profile of said intake material;
   adding to said intake material an appropriate amount of industrial regrind to obtain said target composition;
   granulating said material;
   sizing said granulated material;
   heating said material in three consecutive phases, first at a temperature sufficient to achieve an internal temperature within the material of about 215° to 250° F., then at a temperature sufficient to achieve an internal temperature within the material of about 250° to 320° F. and then at a temperature sufficient to achieve an internal temperature within the material of about 320° to 400° F., wherein said material is mixed during said phases;
   co-extruding said material with a metal reinforcement structure so as to encapsulate said reinforcement structure within said material;
   forcing said material into vacuum profile dies to form a product; and
   cooling said product.

2. A process as in claim 1, wherein said process is continuous.

3. A process as in claim 1, wherein said intake material comprises about 50 to 80 weight percent of said plastic.

4. A process as in claim 1, wherein said intake material comprises a plastic selected from the group consisting essentially of linear low density polyethylene, low density polyethylene, high density polyethylene, polypropylene, polystyrene and PVC.

5. A process as in claim 4, wherein said intake material comprises high density polyethylene.

6. A process as in claim 1, wherein said intake comprises about 20 to about 50 weight percent of said fibrous material.

7. A process as in claim 1, wherein said fibrous material is selected from the group consisting of paper, aluminum foil, sawdust, plywood, fiberglass, carpet, cardboard and apparel fibers.

8. A process as in claim 1, wherein said granulated material has a particle size diameter of about 1/16 to ½ inch after sizing.

9. A process as in claim 1, wherein said material is heated under a pressure of about 2,000 to 7,000 psi.

10. A process as in claim 1, wherein said intake material comprises about 5 to 20 weight percent of said organic material.

11. A process as in claim 1, further comprising coating said final product.

12. A process as in claim 11, wherein said product is coated with a coloring agent.

13. A process as in claim 11, wherein said product is coated with an ultraviolet light absorbent.

14. A process as in claim 1, further comprising treating said final product with radiation.

15. A process as in claim 1, further comprising making a statistical profile of said plastic and fibrous material prior to granulating said material.

16. A process for preparing composite products having a specific target composition from an intake material incorporating commercial, municipal or industrial waste containing organic, plastic and fibrous material comprising:
   taking a statistical profile of said intake material;
   adding an appropriate amount of industrial regrind to obtain said target composition;
   granulating said material;
   sizing said granulated material;
   heating said material in three consecutive phases, first at a temperature sufficient to achieve an internal temperature within the material of about 215° to 250° F., then at a temperature sufficient to achieve an internal temperature within the material of about 250° to 320° F. and then at a temperature sufficient to achieve an internal temperature within the material of about 320° to 400° F., wherein said material is mixed during said heating phases;
   forcing said material into a compression cavity die;
   inserting a mold plug into said compression cavity die;
   pressing the plug and die for a period of time sufficient to form a product; and
   cooling said product.

17. A process as in claim 16, wherein said intake material comprises about 50 to 80 weight percent of said plastic.

18. A process as in claim 16, wherein said intake material comprises a plastic selected from the group consisting essentially of linear low density polyethylene, low density polyethylene, high density polyethylene, polypropylene, polystyrene and PVC.

19. A process as in claim 18, wherein said intake material comprises high density polyethylene.

20. A process as in claim 16, wherein said intake comprises about 20 to about 50 weight percent of said fibrous material.

21. A process as in claim 16, wherein said fibrous material is selected from the group consisting of paper, aluminum foil, sawdust, plywood, fiberglass, carpet, cardboard and apparel fibers.

22. A process as in claim 16, wherein said granulated material has a particle size diameter of about 1/16 to ½ inch after sizing.

23. A process as in claim 16, wherein said heated under a pressure of about 2,000 to 7,000 psi.

24. A process as in claim 16, wherein said intake material comprises about 5 to 20 weight percent of said organic material.

25. A process as in claim 16, further comprising coating said final product.

26. A process as in claim 25, wherein said product is coated with a coloring agent.

27. A process as in claim 25, wherein said product is coated with an ultraviolet light absorbent.

28. A process as in claim 16, further comprising treating said final product with radiation.

29. A process as in claim 16, further comprising making a statistical profile of said intake material prior to granulating said material.

30. A process as in claim 16, further comprising adding pieces of metal, stone or other abrasives to said material in said compression cavity die.

31. A process as in claim 16, further comprising adding additional material to said product prior to cooling; reinserting a mold plug into said compression cavity die; pressing said plug and die for a period of time sufficient to form a laminated product; and cooling said product.

32. A process as in claim 31, further comprising incorporating pieces of metal in said laminated product to provide an interlocking function between two separate products.

* * * * *